Sept. 29, 1925.                                  1,555,388
                    E. L. SCHUMACHER
                    OPHTHALMIC MOUNTING
                    Filed Feb. 12, 1924

INVENTOR
E. L. Schumacher
BY
Harry H. Styll
ATTORNEY

Patented Sept. 29, 1925.

1,555,388

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed February 12, 1924. Serial No. 692,333.

*To all whom it may concern:*

Be it known that I, ELMER L. SCHUMACHER, a citizen of the United States, residing at Southbridge, in the county of Worcester and State of Massachusetts, have invented certain new and useful Improvements in Ophthalmic Mountings, of which the following is a specification.

The present invention relates to improvements in eyeglass and spectacle frames, or the like, commercially known as ophthalmic mountings, and has particular reference to such a frame made in a manner to retain within itself brilliants, or other forms of decorations.

An important object of the invention is to provide a frame of this nature that is formed from such a material that the said material will lend itself to holding or retaining such brilliants or decorations within its makeup in such a manner that it will be difficult for the brilliants or decorations to become accidentally misplaced.

Another important object of the invention is the provision of a cellulose composition material ophthalmic frame which will be so treated that the brilliants or decorations may be set therein and due to the inherent qualities of the material the brilliants will set in a rigid position.

Other objects and advantages of the invention will become apparent during the course of the following description.

In the drawings, wherein like numerals are employed to designate like parts throughout the same:

Figure 1:
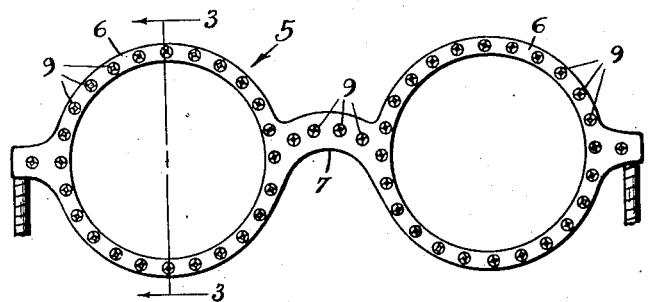
Figure 1 is a front elevation of an ophthalmic mounting embodying my invention.
Figure 2:
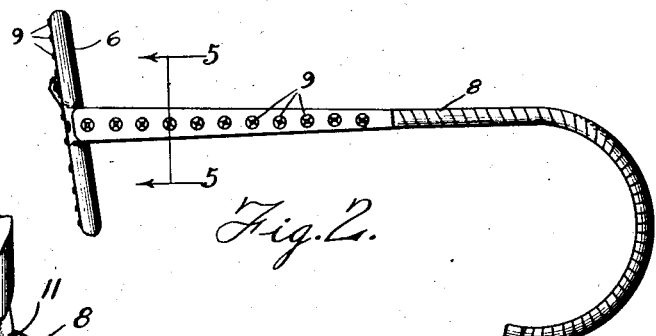
Figure 2 is a side elevation thereof.

In the drawings, wherein for the purposes of illustration is shown the preferred embodiment of the invention, the numeral 5 designates a form of ophthalmic mounting in its entirety, which comprises the eye portions 6, bridge 7 and temples 8. My invention is particularly well adapted to those forms of ophthalmic eyeglass and spectacle frames which embody a portion of cellulose composition material, or the like, which is commonly called zylonite. Of course, there are many forms of eyeglasses and spectacles using a cellulose composition material or zylonite, as it is called, so I do not wish to limit myself to any form of cellulose composition material mounting, or in fact any form of ophthalmic mounting.

In accordance with the present invention a frame is constructed as has ordinarily been done, that is, the eye portions 6, bridge 7, and temples 8 are all polished and completed as has heretofore been done, but I go a step further and insert a plurality of brilliants or other forms of decorations within the said mounting. The brilliants 9 may be set in the mounting in various ways, and in Figure 4 I have illustrated the temple 8 in sections showing the core 10 clearly. In this embodiment recesses 11 are drilled in the said temple and preferably extend a slight way within the core 10 but not sufficiently far to interfere with the strength of the temple in any way. Of course, if a more shallow stone is used, or a heavy temple, it will not be necessary to penetrate the core 10. After the recess 11 has been formed the brilliants 9 may be fixed in place in numerous ways; as is shown in Figure 5, a thin film of cement 13 is placed within the recess. The film 13 may be either applied to the brilliant 9 before it is placed within the recess, or the cement may be placed within the recess first, and the brilliant 9 set therein and allowed to harden after which it will be impossible to remove the brilliant without considerable difficulty. If it is desired to give more brilliancy to the brilliants 9 the cement 13 may be of a silvered nature so that the brilliants will be more conspicuous when placed in the mounting.

Figure 4:
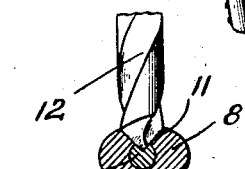
Figure 4 is a sectional view showing one step in the manufacture of the mounting.
Figure 5:
Figure 5 shows one form of retaining the brilliants or other decorations in place.
Figure 6:
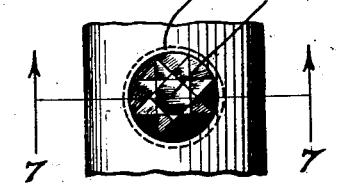
Figure 6 is an enlarged top plan view of another method.
Figure 3:
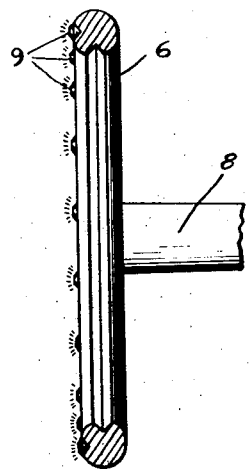
Figure 3 is a sectional view taken on line 3—3 in Figure 1 and looking in the direction of the arrows.
Figure 7:
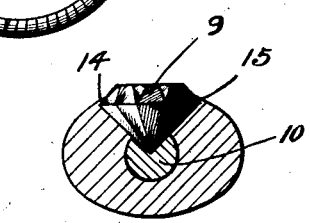
Figure 7 is a section taken on line 7—7 in Figure 6.

In Figures 6 and 7 is shown a slightly modified form or method of setting the brilliants, and in this embodiment the recesses may be drilled as is shown in Figure 4, after which the frames are heated and the stones, which are over-sized for the recesses, are pressed therein so that a lip 14 will extend over the largest diameter 15 of the brilliant 9, so that after the cellulose composition material has been allowed to set, the brilliant will be satisfactorily keyed into place. If the brilliant 9 is shallow enough not to interfere with the core 10 it will not be necessary to drill the hole or recess first, as the composition material may be softened by the application of heat sufficiently to permit of the insertion of the brilliants therein.

Figure 8:
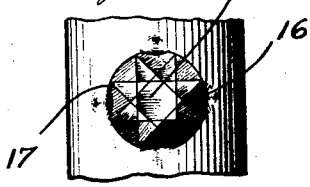
Figure 8 is a top plan view of a slightly modified form.

In Figure 8 the brilliant is held in position by punching the material as at 16 to cause the nibs 17 to rise up over the largest diameter thereof, so as to adequately retain the same in position. This form is quite similar to the manner in which precious stones are maintained in position in metallic mountings. Of course, it is to be understood that all of the brilliants may or may not be coated with a silver backing, or the like, to produce a brilliant that will sparkle more than if such a substance were not used, but this will be left entirely to the judgment of the user.

Referring again to the method of pushing the stones into the cellulose composition material temple, it is wished to be pointed out that such a composition has a tendency to always return to its original shape and curvature so that when the temples and frames are softened by the application of heat, and brilliants placed therein, that upon cooling the composition material will naturally draw together and in so doing the brilliants will be permanently set in position. In other words, I depend upon the inherent qualities and elasticity of the cellulose composition material to retain the brilliants in position.

The selection of the types of stones to be used can be left entirely to the purposes for which it is used, but it is preferable that stones will contrast with the color and shade of the ophthalmic mounting with which it is used.

It is to be understood that the form of my invention herewith shown and described is to be taken as the preferred embodiment of the same and that various changes in the shape, size and arrangement of parts may be resorted to without departing from the spirit of the invention or the scope of the subjoined claims.

Having thus described my invention, I claim:

1. An ophthalmic mounting comprising a composition non-metallic frame member having a conical recess, a gem having a conical under body seated in the recess, a top protruding above the frame and a shoulder between the under body and top, a portion of the frame surrounding the opening extending over the shoulder of the gem to hold it in the recess.

2. An ophthalmic mounting comprising a composition non-metallic frame member having a central recess and a conical recess extending from the central recess to the surface of the frame member, a gem having a conical under body seated in the conical recess and extending into the central recess and held in place in the conical recess by friction of the side walls of the conical recess tending to spring together.

3. The process of seating a gem in a composition non-metallic frame member for an ophthalmic mounting, comprising making a conical recess in the frame member, expanding the conical recess through the natural elasticity of the material of the frame member, seating a gem having a conical under body in the recess, and allowing the conical walls of the frame member to spring back in place through the natural elasticity of the material of the frame.

4. The process of seating a gem in a composition non-metallic frame member of an ophthalmic mounting, comprising making a central recess in the frame, making a conical recess in the frame leading into the central recess, springing the conical recess outwardly, placing a gem having a conical under body in the recess, and permitting the walls of the conical recess to spring together through the natural elasticity of the material of the frame.

5. The process of seating a gem in a composition non-metallic frame member of an ophthalmic mounting, comprising making a conical opening in the frame member, placing a gem having a conical under body in the conical opening, heating the frame member and pressing the upper portion of the frame member above the conical opening over the edges of the gem to hold the same in place in the conical opening.

ELMER L. SCHUMACHER.